US006033162A

United States Patent [19]

Uebele et al.

[11] Patent Number: 6,033,162

[45] Date of Patent: Mar. 7, 2000

[54] BIT ADAPTOR

[75] Inventors: Klemens Uebele, Illmensee; Klaus Dreps, Altshausen, both of Germany

[73] Assignee: Firma DreBo Werkseug-Fabrik GmbH, Altshausen, Germany

[21] Appl. No.: 08/953,025

[22] Filed: Oct. 17, 1997

[30] Foreign Application Priority Data

Oct. 16, 1996 [DE] Germany ........................ 296 17 991 U
May 26, 1997 [EP] European Pat. Off. .............. 97108485

[51] Int. Cl.[7] ...................................................... B23B 31/10

[52] U.S. Cl. ..................... 408/239 R; 279/145; 279/144; 7/158

[58] Field of Search .............................. 279/145, 75, 144, 279/143; 408/239 R; 7/158, 165

[56] References Cited

U.S. PATENT DOCUMENTS

| | | | |
|---|---|---|---|
| 2,341,947 | 2/1944 | Roberts | 77/31 |
| 3,973,784 | 8/1976 | Smith | 279/1 A |
| 5,586,847 | 12/1996 | Mattern et al. | 279/145 |
| 5,722,805 | 3/1998 | Giffin | 408/239 R |

FOREIGN PATENT DOCUMENTS

| | | | |
|---|---|---|---|
| 2509961 | 9/1976 | Germany . | |
| 2822372 | 11/1979 | Germany | 7/158 |
| 3915458 | 11/1990 | Germany | 279/145 |

*Primary Examiner*—Daniel W. Howell
*Assistant Examiner*—Rouzbeh Tabaddor
*Attorney, Agent, or Firm*—Robert W Becker & Associates

[57] ABSTRACT

A bit adaptor has a guide sleeve having a first end and a second end. The first end has an axially extending polygonal receiving member for receiving a screwdriver bit. The second end has an axially extending blind bore for receiving a drill bit. The blind bore has a bottom portion for torsionally engaging a tip of the drill bit. The bottom portion has a support structure for supporting a cutting plate of a tip of the drill bit, wherein the support structure provides at least a linear support for the cutting plate.

19 Claims, 2 Drawing Sheets

BIT ADAPTOR

BACKGROUND OF THE INVENTION

The present invention relates to a bit adaptor comprising a guide sleeve in which a drill bit is received and having a receiving member, especially a square or hexagonal connector, for a screwdriver bit, whereby the blind bore for receiving the drill bit has follower elements at its bottom for a torsional connection of the drill bit inorder to entrain and rotate the drill bit.

Such a bit adaptor is known from German Offenlegungsschrift 39 15 458. This drill bit adaptor is characterized by an especially good transmission of torsional forces even when sensitive, i.e., brittle, hard metal plates project laterally and toward the center. The torsional transmission in this known device is performed by lateral flanks of the drill bit head which contact lateral walls of the correspondingly shaped blind bore or of a guide sleeve.

Even though the known device is especially suitable for transmission of torque, the drill bit has the tendency to jam within the bit adaptor when high axial forces are exerted. On the other hand, the operator has the tendency, based on his practical experience, to exert a very strong axial load onto the bit adaptor especially for screwing in Phillips-head screws. This is so because, on the one hand, when an accidental slipping of the screwdriver bit on the Phillips-head screw occurs, at least one Phillips-head screw will become defective and must be removed in a cumbersome manner and, on the other hand, a comparatively great wear on the edges of the screwdriver bit will be generated which, over time, will cause the screwdriver bit to slip even more often.

The bit adaptor can be released from the drill tool by pounding on it with a hammer or a similar device when it is jammed. However, the operator will usually try to remove the bit adaptor from the drilling tool simply by pulling. This, however, constitutes a greater risk for injury because the operator can easily be hurt by the sharp and practically helically extending cutting edges of the drill bit. This risk is even greater for inexperienced hobby craftsmen which use such drill bits only infrequently.

Another bit adaptor is known from German Offenlegungsschrift 25 09 961. This bit adaptor in one embodiment has at its rearward end a rotary follower so that the drill bit must be practically threaded into the bit adaptor in order to be useable. This embodiment is impractical because the insertion and removal always requires multiple turns and actuation of the drilling tool until the bit adaptor has been completely inserted. Furthermore, an actuation for turning the screws to the left, i.e., for loosening screws is problematic because the drill bit has the tendency to become detached from the bit adaptor.

In another embodiment, a longitudinal slot is provided which ends bluntly and essentially provides a following action by the hard metal plates of the drill bit projecting from the drill bit. In this embodiment, the hard metal plate is greatly loaded with torsional forces whereby the drill bit is, in general, not suited for such loading. In some cases the radial projection of the hard metal plate is only so minimal that the hard metal plate can be engaged by the longitudinal slot only to a minimal extent and, due to thus resulting minimal contact surfaces, is extremely loaded at its outer edges. Since the hard metal plates are very hard but also brittle, they have the tendency to break when unfavorable load conditions occur.

Thus, this solution is suitable only when drill bits with identical dimensions, especially with identical thread diameter are used. Even though the actual diameter of the drill bits of different manufacturers is of the same size, the diameter of the helical thread, i.e., the projecting portions of the hardmetal plates, will fluctuate from manufacturer to manufacturer. For a reduced actual dimension the known drill bit cannot be exactly guided while for an excessive actual size the thread of the drill bit has the tendency to become jammed within the guide bushing?

Also, both variants of the bit adaptor known from German Offenlegungsschrift 25 09 961 experience great wear so that it is not surprising that this solution, despite its advantages, has not been accepted by the customer.

It is therefore an object of the present invention to provide a bit adaptor of the aforementioned kind which, with respect to the employed materials on the one hand and the observance of tolerances for the dimensions of the drill bit on the other hand, is less critical and is also, in general, suitable for insertion of bolts.

SUMMARY OF THE INVENTION

A bit adaptor according to the present invention is primarily characterized by:

A guide sleeve having a first and a second end;

The first end having an axially extending polygonal receiving member for receiving a screwdriver bit;

The second end having an axially extending blind bore for receiving a drill bit;

The blind bore having a bottom portion for torsionally engaging a tip of the drill bit;

The bottom having a support structure for supporting a cutting plate of a tip of the drill bit, wherein the support structure provides at least a linear support for the cutting plate.

Advantageously, the cutting plate is a hard metal plate and has a cutting edge contacting the bottom portion, wherein the hard metal plate is exclusively axially loaded during operation of the bit adaptor.

Preferably, the bottom portion is conical and has an opening angle of 130°.

The bottom portion has lateral surfaces for torsionally engaging lateral flanks of the tip of the drill bit.

The bottom portion is a slot.

The guide sleeve is comprised of hardened steel.

The bottom portion is comprised of hardened steel.

The cutting plate is preferably a hard metal plate projecting laterally from the tip of the drill bit without laterally contacting the bottom portion.

The guide sleeve includes an elastic sleeve portion positioned at the second end.

The elastic sleeve portion consists of plastic material.

The bottom portion is elastic and, in a radial direction of the guide sleeve, is smaller than the tip of the drill bit.

The guide sleeve is comprised of a first sleeve portion consisting of hardened steel and a second sleeve portion consisting of a material softer than hardened steel, wherein the second sleeve portion is attached to the first sleeve portion by injection-molding or casting.

The first sleeve portion extends over more than half a length of the guide sleeve.

The polygonal receiving member extends within the first sleeve portion and the blind bore extends through the second sleeve portion into the first sleeve portion, wherein the bottom portion is located in the first sleeve portion, wherein the bottom portion has a slanted surface, and wherein a slant angle of the bottom portion matches a slant angle of the cutting plate.

Advantageously, the bit adaptor further comprises a torque limiter for canceling a rotationally fixed connection between the screwdriver bit and the drill bit when a selected torque limit is surpassed.

Preferably, the torque limiter is a slip coupling.

The bit adaptor may further comprise a permanent magnet positioned adjacent to the polygonal receiving member.

Advantageously, the bit adaptor further comprises a grip rotatably connected to the guide sleeve.

Preferably, the grip includes a sleeve, slidably connected to an outer mantle surface of the guide sleeve, and further includes a grip ring fixedly attached to the sleeve.

Expediently, the guide sleeve includes a plastic sleeve portion and the sleeve is slidably connected to an outer mantle surface of the plastic sleeve portion.

Despite the use of very simple constructive means, the inventive embodiment improves the usefulness of the bit adaptor substantially. The inventive bit adaptor no longer has the tendency to jam on the drill bit. The axial roadability is especially excellent so that even the insertion of bolts for use with hammer drilling tools is possible.

It is especially advantageous in this context when the bit adaptor is comprised of hardened steel, at least in the area of the guide sleeve bottom portion. The contact provided substantially as a linear support on the hard metal plate allows, on the one hand, an excellent axial force transmission whereby the drill bit is loaded in a similar manner as it would during percussion drilling, i.e., in a manner that it is designed for and in a direction in which it is especially loadable.

The linear support action optionally results in a minimal material displacement that further improves the uniform application of force but does not increase the risk of jamming whereby essentially a surface or areal abutment (support) results.

A further important aspect is the release of the hard metal plate from any torque transmission. Especially the sensitive radially outwardly projecting portions of the hard metal plate are free of such loads and can thus not break.

Fitting of the flattened areas of the guide sleeve which serves as a torque transmission device is matched to the drill bit to be used. A minimal tolerance, respectively, a slight elasticity of the guide sleeve is of no consequence when, due to the flattened portion deviating substantially from a circular shape, a sufficient surface area for torque transmission is provided.

The insensitivity to tolerances of the inventive bit adaptor results especially when the rear portion of the guide sleeve is comprised of an elastic material. Preferably, the elastic material is a plastic material. Instead, the rearward end of the bit adaptor can also be embodied so as to have thin side walls so that the drill bit to be received upon insertion elastically widens the bit adaptor. This type of plug-in or compression fit connection has the advantage that the bit adaptor cannot accidentally fall off the drill bit, as may be the case in the prior art device disclosed in German Offenlegungsschrift 25 09 961.

The inventive solution has the special advantage that an improved guiding precision is ensured. Due to the smaller size of the slot thickness for the insertion of the drill bit, the guide sleeve experiences an especially secure attachment to the tip of the drill bit while it is supported in a play-free fitting at the upper end at the helical thread of the drill bit.

Even when straight blades for single slot screwheads are used as screwdriver bits there is no tendency of the straight blade during tightening of the screw to move away from the center. Surprisingly, very good torque transmission results even when the support is ensured primarily by the elastic plastic material.

When tightening the screw, the slot or the flattened guide sleeve bottom portion can be widened in an elastic manner slightly for the torque transmission without impairing the guiding precision. Surprisingly, this also prevents thread stripping of the screw when the torque applied is too great because the elastic widening also is beneficial for braking the drilling machine until the torque limiter reacts.

Such a torque limitation is important relevant when the screws during threading are not softly braked but very suddenly contact the end abutment, i.e., when using a great thread pitch a comparatively hard dowel material and a hard stop.

Surprisingly, the wear resistance of the inventive bit adaptor or drill attachment is especially good. It is especially favorable in this context that the inventive drill attachment in the circumferential direction does not contact the hard metal plate of the rock drill bit. Instead, guiding as well as supporting occurs in the direction longitudinal to the hard metal plate at the steel surrounding the hard metal plate, but the main guiding action is provided by the slot pressure with the contact force perpendicular to the hard metal plate.

It is understood that a lateral projection of the hard metal plates past the thread of the drill bit may be taken into account by providing a respective widening of the slot in order to ensure that no radial abutment between the hard metal plate and the drill attachment occurs.

According to a preferred embodiment, it is suggested to contact the tip of the drill bit with a metallic part of the drill attachment and to contact the rearward helical thread of the drill bit with a plastic part of the drillbit adaptor. The two parts of the drillbit adaptor can be flush at the inner as well as outer side. This can be realized by injection molding in a manner known per se the plastic part onto the metal part. Preferably, in the area of torque transmission of the tip of the drill bit, the metal part has a material thickness that is comparatively thin so that a correspondingly increased material thickness for the plastic part results.

According to a further preferred embodiment, a rounded transition between the upper end of the slot and the adjacently positioned area of the guide sleeve is provided. This rounded portion serves as an abutment shoulder for the transmission of axial forces during screwdriver operation of the inventive drill adaptor.

Preferably, the connection between the metal part and the plastic part of the inventive drill adaptor is embodied so as to be suitable for torque transmission. The cross-sectional area thus deviates from a circular shape and the inventive drill adaptor thus has a minimal tendency to deform torsionally so that upon widening of the slot is countered by increased resistance.

In this context, a further embodiment suggests that the slot is not only provided at the very bottom of the blind bore but also somewhat above the end or bottom of the blind bore. This results in lateral walls or inner walls adjacent to the bottom of the blind bore which are more elastic so that it is more easily possible to compensate tolerances between the individual drill bits and/or deviations in the shape of the drill bit tip found for different manufacturers of the drill bit.

In this context it is understood that the inventive drill adaptor is provided only for a single drill bit diameter.

According to a further especially advantageous embodiment, it is suggested that a torque limiter device is integrated into the drill bit adaptor. Even though drilling tools with screwdriving capabilities, i.e., with rpm control, often are provided with such torque limiters in the form of slip couplings (clutches) with adjustable driving force, the inventive drill adaptor can be used with devices such as commercially used robust hammer drill devices which, in general, are not provided with an electronic rpm control and do not have a corresponding slip coupling (clutch).

A slip coupling can be embodied in any suitable manner as a torque limiter in the drill bit adaptor whereby it is preferred that the hexagonal or square receiving member for the screwdriver bit is guided rotationally within the drill bit adaptor against a locking resistance.

Especially when embodying the inventive drill adaptor of a plastic material, but also for an embodiment of metal, the screwdriver bits can be secured with a permanent magnet which is positioned adjacent to the screwdriver bit, respectively, the respective receiving member and which acts onto the conventionally ferrometalic screwdriver bit as well as onto the screw so as to secure it and is especially suitable and advantageous in context with Phillips head screws.

The inventive drill adaptor is suitable for screwdriving operation, i.e., for tightening or loosening screws, as well as for hammer drill operation. When used in hammer drill operation, it is used for receiving bolts which, via the hammer drill tool, are subjected to percussion, whereby in this embodiment it is preferred to provide a blind bore as an extension of the guide sleeve such that an axial force transmission is performed with comparatively minimal wear.

A further preferred embodiment of the invention suggests a grip which allows the operator to guide of the drill adaptor that secures the respective screwdriver bit with his free hand in a much improved manner, especially in the close vicinity of the screw. For this purpose a sleeve is provided that is connected to the outer mantle surface of the drill adaptor and provides a slide bearing for the grip portion which is concavely designed so as to be ergonomic. In this embodiment it is also possible to change the position of the grip by exerting a corresponding amount of force in order to provide for a guiding in the vicinity of the screw or, when inserting screws at a certain depth, to be sufficiently spaced from the screw.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 and 2.

Figure 1:
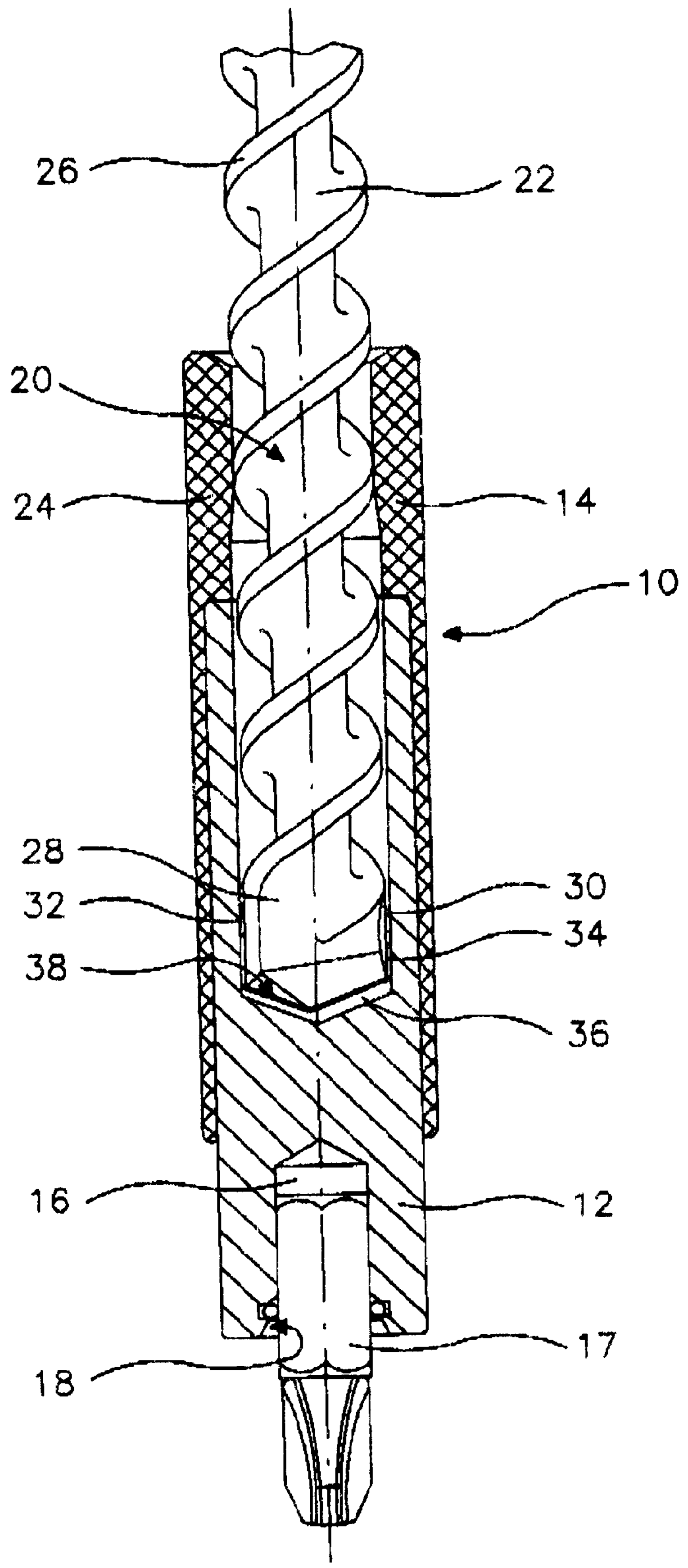
FIG. 1 is an embodiment of the inventive bit adaptor in section with the drill bit inserted.

The bit adaptor or drill attachment 10 represented in FIG. 1 is comprised of a guide sleeve having a metal portion 12 and a plastic portion 14 injection molded onto the metal portion 12. The metal portion 12 is provided at its forward end (the left end shown in the representation of FIG. 1) with a known hexagonal receiving member 16 for a screwdriver bit 17. Preferably, the hexagonal receiving member 16 is provided with a slant 18 in order to facilitate introduction of the screwdriver bit 17.

The guide sleeve of the drill bit adaptor 10 comprises a blind bore 20 for a drill bit 22. The upper end 24 of the guide sleeve is embodied exclusively by the plastic portion 14 and in the remaining areas by the metal part 12 and the overlapping plastic part 14. The plastic part 14 surrounds the metal part 12. The blind bore 20 of the guide sleeve thus has a smooth inner surface which receives in a play-free manner the drill bit 22, i.e., the drill thread or helix 26. In this area the blind bore 20 is of a circular inner and outer contour.

The tip 28 of the drill bit is received in a slot 30 at the inner end of the blind bore 20 of the guide sleeve. The bottom portion of the blind bore 20 which can be seen more clearly in FIG. 2. The slot 30 may be smaller than the thickness of the tip 28 of the drill bit so that the drill bit tip 28 will force it apart to thereby secure the tip 28 by compression fit at the two lateral surfaces 32 and 34. The lateral surfaces 32 and 34 extend so as to partly overlap the hard metal plate 36 to the rear into the area where the helical thread of the drill bit begins. The entire area of the lateral surfaces 32, 34 is used for contact at the slot 30 so that a force transmission surface area as large as possible is provided.

The slot 30 has a bottom 38 that is conically shaped and has a conical angle of approximately 130°. The hardmetal plate 36 of the drill bit 22 rests at this conically shaped portion.

As can be seen in FIG. 1, the bit adaptor 10 extends, even though the drill bit is inserted in the area of the slot 30, in a straight line without any curved portion. Such an embodiment is preferred for reasons of aesthetics whereby it is understood that in this embodiment, when the drill bit is not inserted, the bit adaptor 10 is recessed in the area of the slot 30.

It is furthermore understood that as an alternative manufacturing embodiment, the outer surface of the drill adaptor extends straight when the drill bit is not inserted. When the drill bit is then inserted, the outer surface in the area of the slot 30 will project slightly outwardly due to the elastic embodiment of the slot 30. In both cases the shape difference can be used as an indicator for correct insertion of the drill bit 22.

Figure 2:
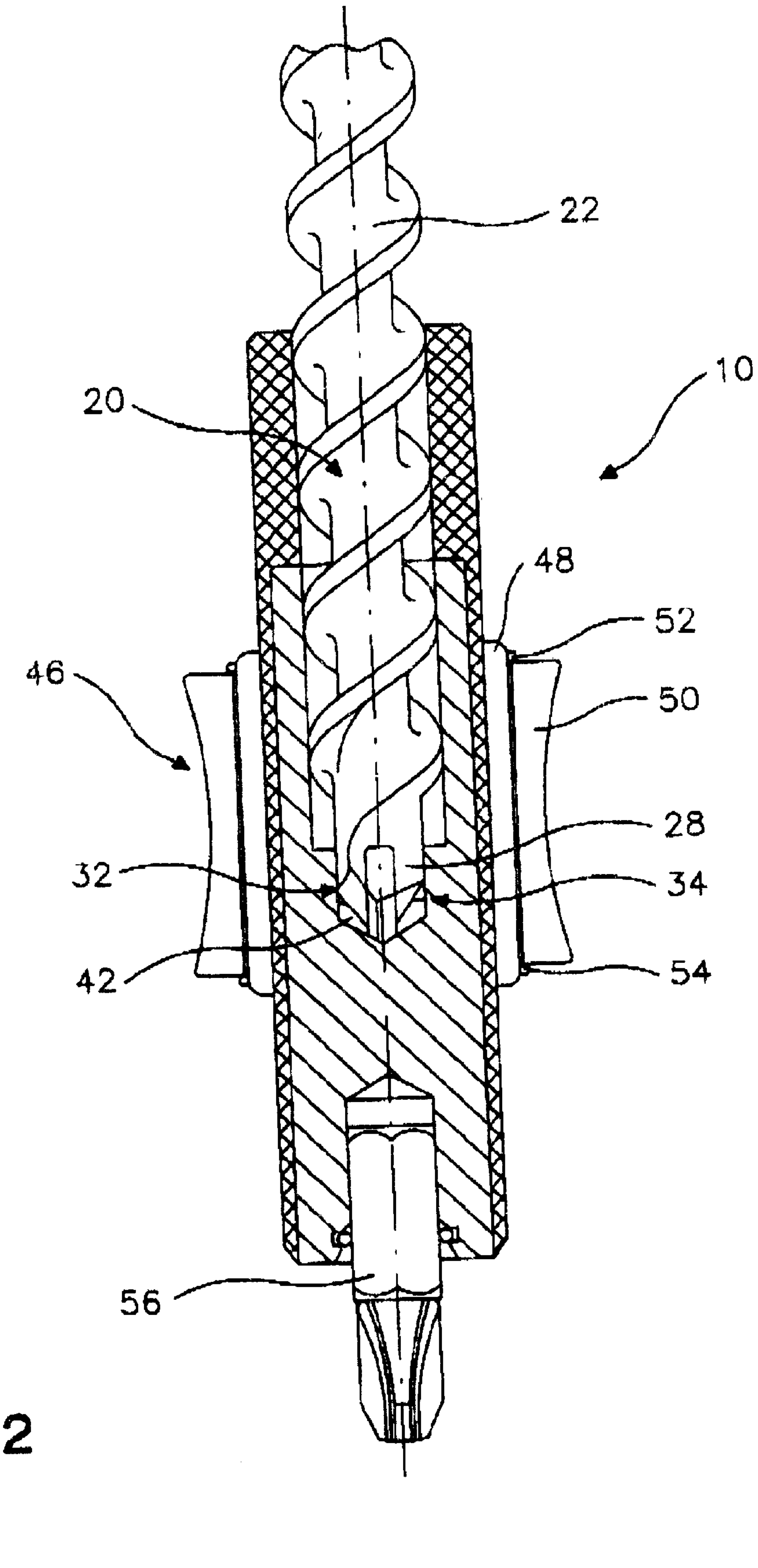
FIG. 2 shows a further embodiment of the inventive drill bit adaptor in section.

The slot 30 at its upper end is provided with a curved portion, as is shown in FIG. 2.

It is understood that the inventive embodiment of the drill bit adaptor 10 can be adjusted in various ways to different specifications. For example, the slot 30 can taper slightly in the inward direction in order to provide for additional axial support laterally adjacent to the hard metal plate 36. For improving the axial support, a support surface that extends upwardly to a great extent may be provided which ensures a secure support at both helical threads in order to thus prevent wear resulting from contacting the cutting edges of the helical thread 26.

Furthermore, if necessary, the plastic part 14 can be completely eliminated when, simply by varying the wall thickness of the metal, the desired elasticity and guiding capability is provided. Also, it is, in general, possible to manufacture the bit adaptor 10 exclusively of plastic material. It is understood that a correspondingly wear-resistant plastic material is preferred.

As can be seen in FIG. 2, the modified embodiment of the inventive drill adaptor 10 comprises a blind hole 42 at the bottom portion of the guide sleeve 20 which has a design that allows contact of the tip of the drill bit at the bottom of the blind hole and thus ensures an especially excellent transmission of axial forces, for example, for attachment of bolts.

This embodiment furthermore comprises a grip 46 that serves to guide the drill bit 22 with attached bit adaptor 10 in a more precise manner. The grip 46 for this purpose has a sleeve 48 which is slipped onto the bit adaptor 10 and rotates with it. A grip ring 50 is mounted on the sleeve 48 and can be rotated thereon. The grip ring 50 is secured with spring rings 52 and 54 on the sleeve 48 so that it cannot fall off. The grip ring 50 has a concavely shaped outer surface and is preferably provided with a slip-resistant layer so that the actuation is facilitated.

According to a modified embodiment, it is suggested that the sleeve 48 can be displaced by sliding when a respective force is exerted in order to adjust the position of the grip 46 relative to the respective arrangement of the screw to be tightened. It is thus possible to use the grip 46 even when a screw that is positioned in a deep bore hole must be tightened.

The tip of the drill bit 22 is guided within the blind hole 42 in this embodiment such that via the lateral support at the lateral surfaces 32 and 34 of the tip 28 a torque transmission is possible. This arrangement allows supporting of the hard metal plates at the conical bottom of the blind hole with transmission of axial forces onto the inserted bit 56.

It is preferred that the bottom of the blind hole 42 has an opening angle which corresponds to the tip angle of the drill bit at its hard metal plate, i.e., it should have an angle of 130°.

The present invention is, of course, in no way restricted to the specific disclosure of the specification and drawings, but also encompasses any modifications within the scope of the appended claims.

What is claimed is:

1. A bit adapter comprising:

a guide sleeve having a first end and a second end;

said first end having an axially extending polygonal receiving member for receiving a screwdriver bit;

said second end having an axially extending blind bore for receiving a drill bit;

said blind bore having a bottom portion for torsionally engaging a tip of the drill bit;

said bottom portion having a support structure for supporting a cutting plate of a tip of the drill bit, wherein said support structure provides at least a linear support for the cutting plate;

wherein said bottom portion is elastic and, in a radial direction of said guide sleeve, is smaller than the tip of said drill bit.

2. A bit adapter according to claim 1, wherein said bottom portion has lateral surfaces for torsionally engaging lateral flanks of the tip of the drill bit to provide torque transmission.

3. A bit adapter according to claim 1, wherein the cutting plate is a hard metal plate and has a cutting edge contacting said bottom portion, wherein said hard metal plate is exclusively axially loaded during operation of said bit adapter.

4. A bit adapter according to claim 1, wherein said bottom portion is conical and has an opening angle of 130°.

5. A bit adapter according to claim 1, wherein said bottom portion is a slot.

6. A bit adapter according to claim 1, wherein said guide sleeve is comprised of hardened steel.

7. A bit adapter according to claim 1, wherein said bottom portion is comprised of hardened steel.

8. A bit adapter according to claim 1, wherein the cutting plate is a hard metal plate projecting laterally from the tip of the drill bit without laterally contacting said bottom portion.

9. A bit adapter according to claim 1, further comprising a permanent magnet positioned adjacent to said polygonal receiving member.

10. A bit adapter according to claim 1, further comprising a grip rotatably connected to said guide sleeve.

11. A bit adapter comprising:

a guide sleeve having a first end and a second end;

said first end having an axially extending polygonal receiving member for receiving a screwdriver bit;

said second end having an axially extending blind bore for receiving a drill bit;

said blind bore having a bottom portion for torsionally engaging a tip of the drill bit;

said bottom portion having a support structure for supporting a cutting plate of a tip of the drill bit, wherein said support structure provides at least a linear support for the cutting plate;

wherein said guide sleeve includes an elastic sleeve portion positioned at said second end.

12. A bit adapter according to claim 10, wherein said elastic sleeve portion consists of plastic material.

13. A bit adapter comprising:

a guide sleeve having a first end and a second end;

said first end having an axially extending polygonal receiving member for receiving a screwdriver bit;

said second end having an axially extending blind bore for receiving a drill bit;

said blind bore having a bottom portion for torsionally engaging a tip of the drill bit;

said bottom portion having a support structure for supporting a cutting plate of a tip of the drill bit, wherein said support structure provides at least a linear support for the cutting plate;

wherein said guide sleeve is comprised of a first sleeve portion consisting of hardened steel and a second sleeve portion consisting of a material softer than hardened steel, wherein said second sleeve portion is attached to said first sleeve portion by injection-molding or casting.

14. A bit adapter according to claim 13, wherein said first sleeve portion extends over more than half a length of said guide sleeve.

15. A bit adapter according to claim 13, wherein said polygonal receiving member extends within said first sleeve portion and wherein said blind bore extends through said second sleeve portion into said first sleeve portion, wherein said bottom portion is located in said first sleeve portion, wherein said bottom portion has a slanted surface, and wherein a slant angle of said bottom portion matches a slant angle of said cutting plate.

16. A bit adapter according to claim 13, further comprising a torque limiter for cancelling a rotationally fixed connection between the screwdriver bit and the drill bit when a selected torque limit is surpassed.

17. A bit adapter according to claim 16, wherein said torque limiter is a slip coupling.

18. A bit adapter comprising:

a guide sleeve having a first end and a second end;

said first end having an axially extending polygonal receiving member for receiving a screwdriver bit;

said second end having an axially extending blind bore for receiving a drill bit;

said blind bore having a bottom portion for torsionally engaging a tip of the drill bit;

said bottom portion having a support structure for supporting a cutting plate of a tip of the drill bit, wherein said support structure provides at least a linear support for the cutting plate;

a grip rotatably connected to said guide sleeve;

wherein said grip includes a sleeve, slidably connected to an outer mantle surface of said guide sleeve, and further includes a grip ring fixedly attached to said sleeve.

19. A bit adapter according to claim 18, wherein said guide sleeve includes a plastic sleeve portion and wherein said sleeve is slidably connected to an outer mantle surface of said plastic sleeve portion.

* * * * *

UNITED STATES PATENT AND TRADEMARK OFFICE

CERTIFICATE OF CORRECTION

PATENT NO. : 6,033,162

DATED : March 7, 2000

INVENTOR(S) : Klemens Uebele and Klaus Dreps

It is certified that error appears in the above-identified patent and that said Letters Patent is hereby corrected as shown below:

On the title page: Item [22] Filed: should read as follows"

-- Oct. 16, 1997 --.

Signed and Sealed this

Ninth Day of January, 2001

Attest:

Q. TODD DICKINSON

Attesting Officer

*Commissioner of Patents and Trademarks*